Aug. 25, 1959   H. NERWIN   2,900,887
PHOTOGRAPHIC CAMERA
Filed Nov. 1, 1952   7 Sheets-Sheet 1

INVENTOR.
HUBERT NERWIN
BY
*B. Eshbinger*
ATTORNEY

Aug. 25, 1959    H. NERWIN    2,900,887
PHOTOGRAPHIC CAMERA
Filed Nov. 1, 1952    7 Sheets-Sheet 2
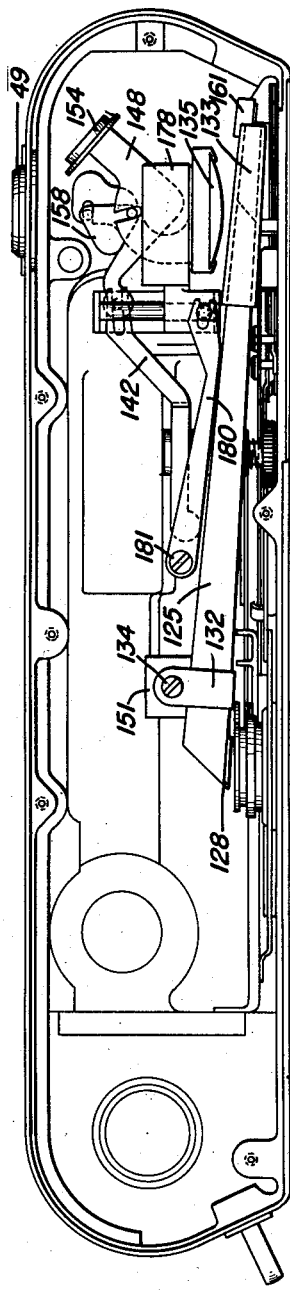
Fig.3.
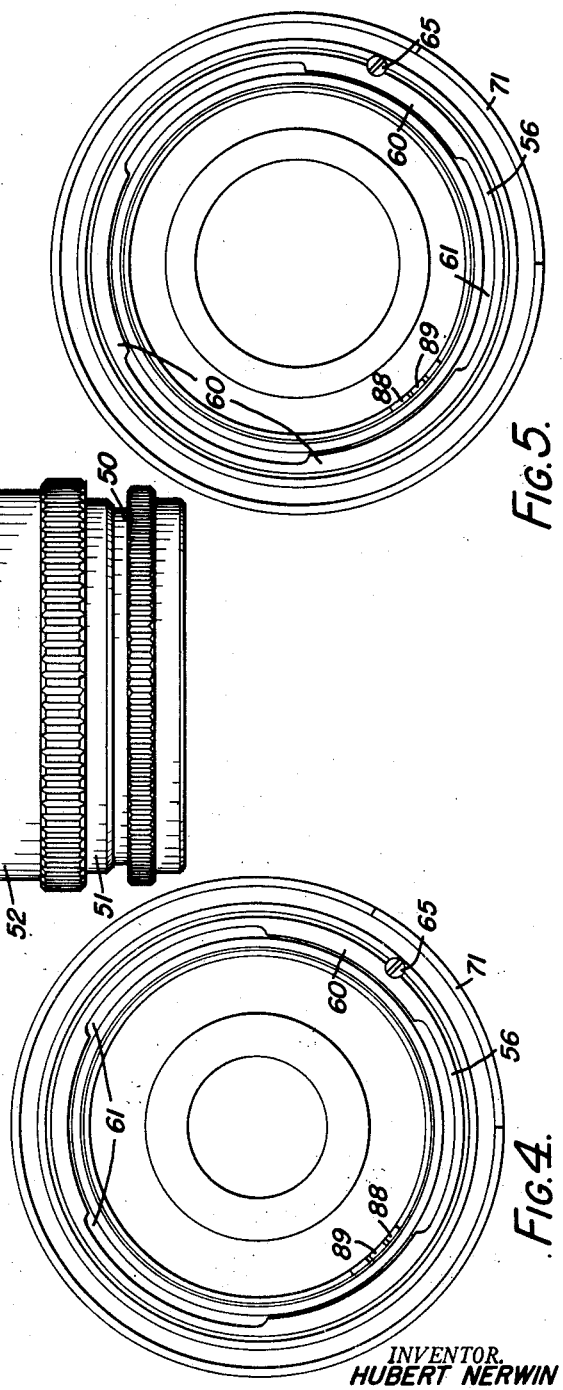
Fig.5.
Fig.4.
INVENTOR.
HUBERT NERWIN
BY
ATTORNEY Aug. 25, 1959　　　　H. NERWIN　　　　2,900,887
PHOTOGRAPHIC CAMERA
Filed Nov. 1, 1952　　　　　　　　　　7 Sheets-Sheet 3
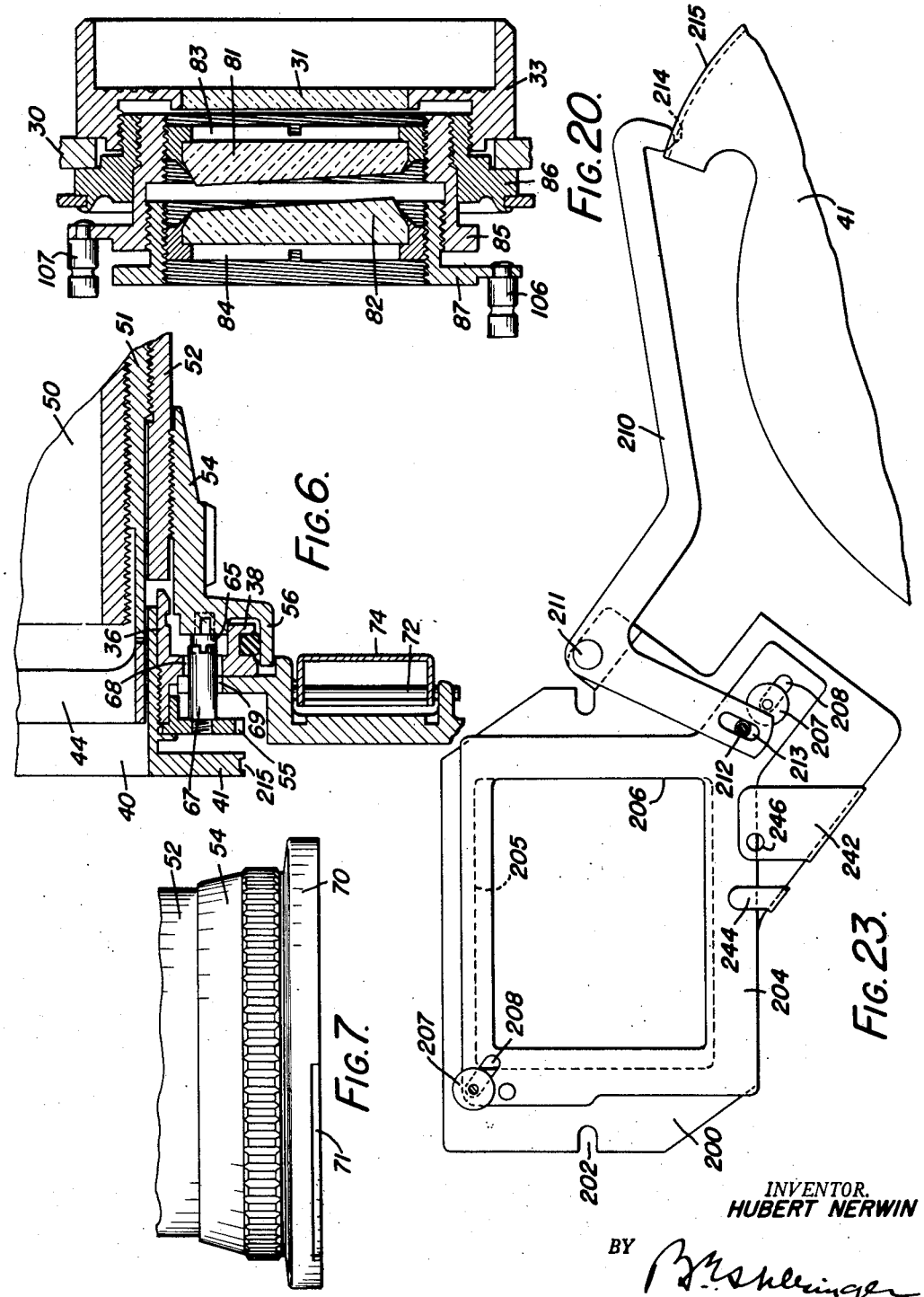
INVENTOR.
HUBERT NERWIN
ATTORNEY

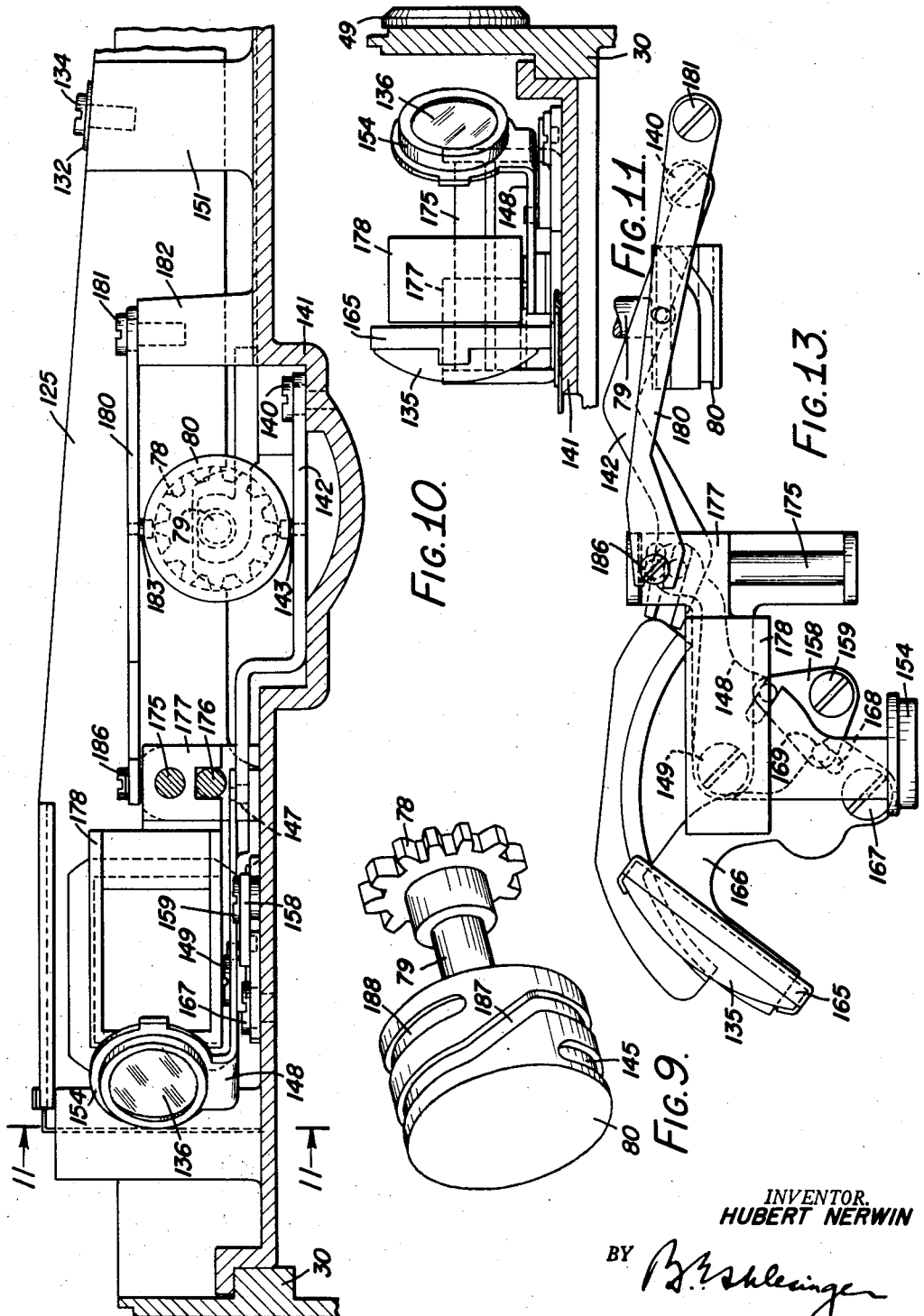

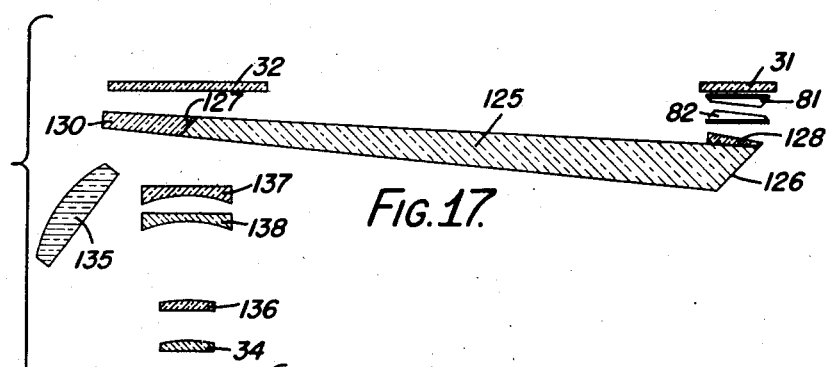
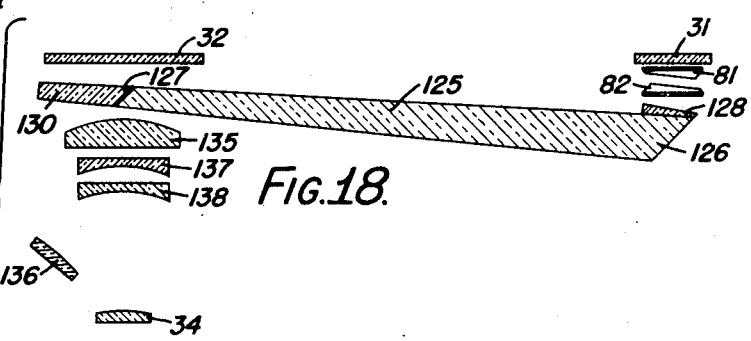
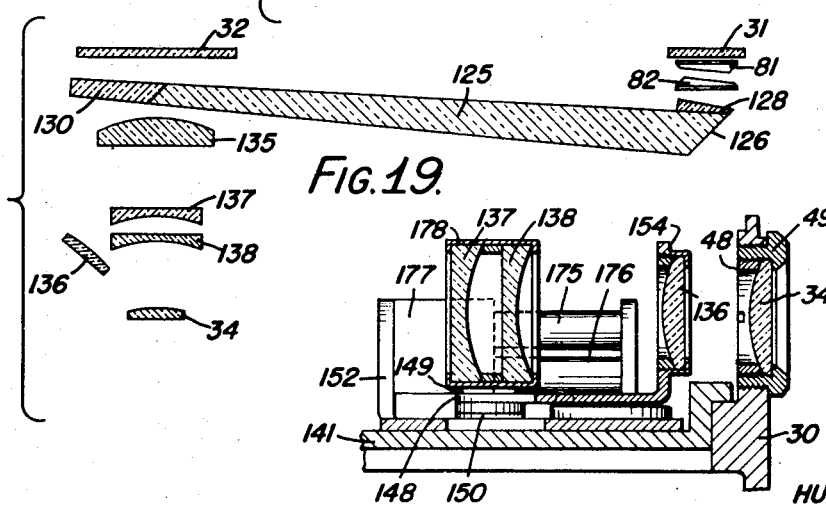
INVENTOR.
HUBERT NERWIN

Aug. 25, 1959  H. NERWIN  2,900,887
PHOTOGRAPHIC CAMERA
Filed Nov. 1, 1952  7 Sheets-Sheet 6
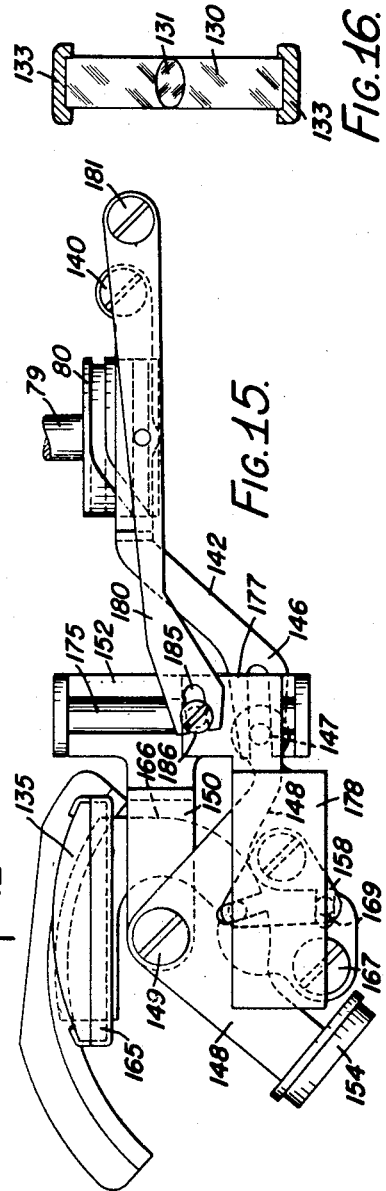
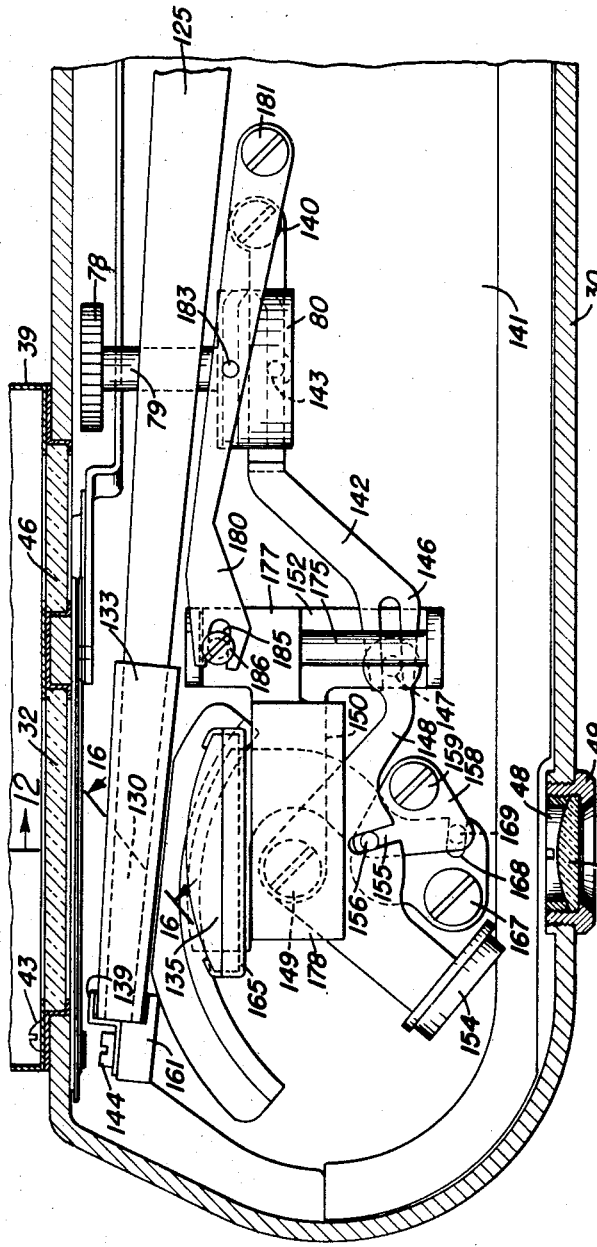
INVENTOR.
HUBERT NERWIN
BY
ATTORNEY

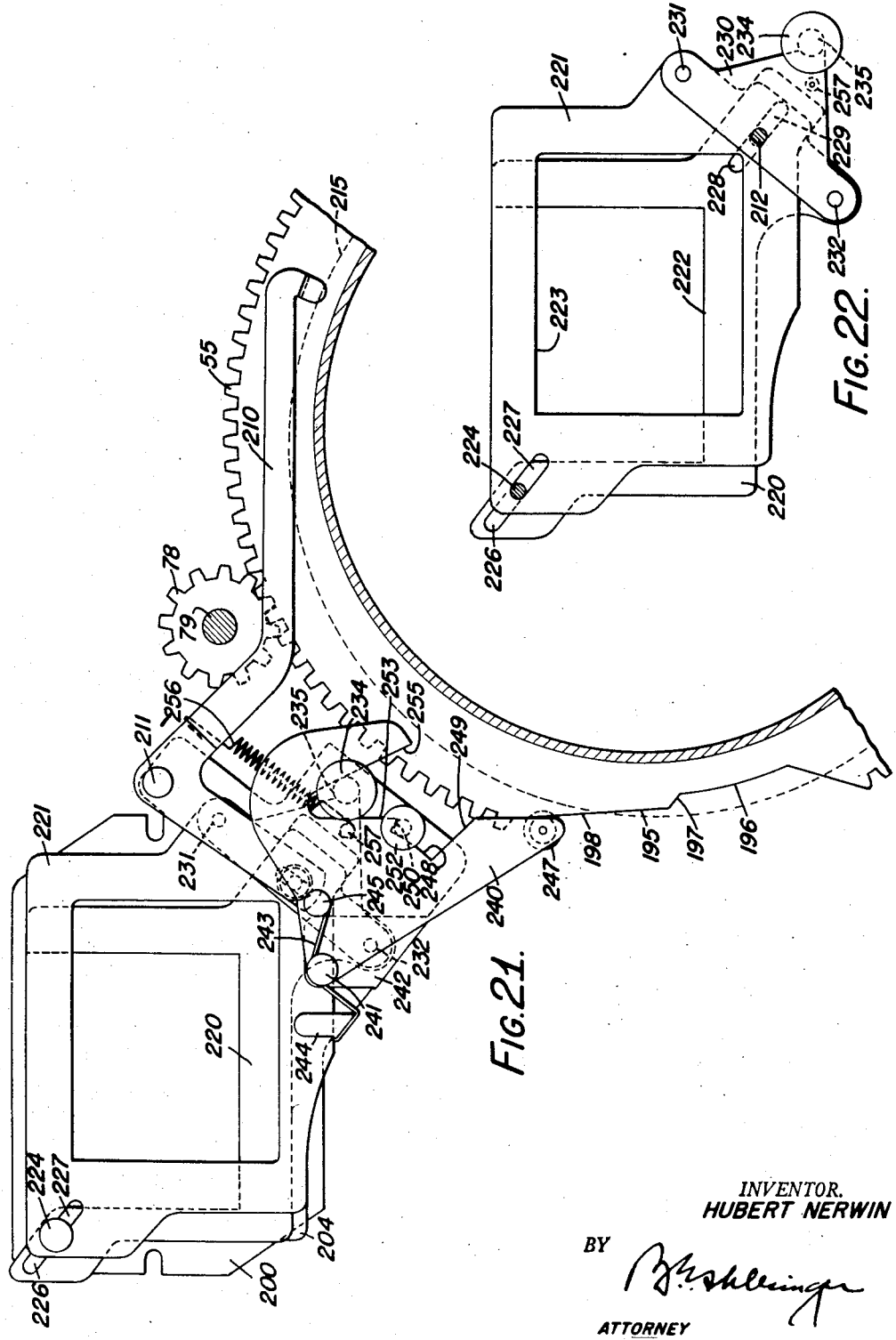

United States Patent Office 2,900,887
Patented Aug. 25, 1959

2,900,887

PHOTOGRAPHIC CAMERA

Hubert Nerwin, Rochester, N.Y., assignor, by mesne assignments, to the United States of America as represented by the Secretary of the Army Application November 1, 1952, Serial No. 318,231

9 Claims. (Cl. 95—44)

The present invention relates to photographic cameras, and more particularly to a photographic camera that is adapted to be used with any one of a number of different, interchangeable photographic objective lenses, and which has a base rangefinder that is adapted to be coupled with each objective lens mount when that mount is connected to the camera. This application is a continuation-in-part of my U.S. patent applications, Serial Nos. 288,511 and 291,441, filed May 17, 1952 and June 3, 1952, respectively, now Patents Nos. 2,719,454 and 2,811,908, respectively, granted October 4, 1955 and November 5, 1957, respectively.

When a camera is provided with a coupled rangefinder, the conventional practice is to provide separate viewing windows or eyepieces for the viewfinder of the camera and for the rangefinder. This arrangement has, however, the objection that the photographer must shift his eye back and forth from the rangefinder eyepiece to the viewfinder eyepiece while focusing the camera. In moving his eye, the photographer is liable to move the camera slightly with the result that the photograph will not give precisely the picture desired, or the picture will not be defined sharply.

Where the camera is adapted to be used with a plurality of different, interchangeable objective lenses, the problem of employing a single eyepiece for both rangefinder and viewfinder purposes is complicated by reason of the fact that the window opening in the front of the camera through which the object, which is to be photographed, is viewed, restricts the size of the view. The window opening would define the field of view for a wide angle lens. If the same viewfinder-rangefinder system is used for all of the lenses that are employed in the camera, which is the only practical construction, a conventional viewfinder system would have to be masked down terrifically for other lenses, such as normal angle and telephoto lenses. The problem is further complicated by reason of the fact that the conventional rangefinder depends for its operation upon obtaining alignment of two images of the object which is to be photographed, and by reason of the fact that those images will vary in size, of course with the focal length of the lens used. For a telephoto lens, for instance, the image normally produced in the rangefinder is quite small. The definition or resolving power of the partial images that would be produced in a rangefinder-viewfinder system, when used with interchangeable objective lenses, would be, therefore, normally relatively so small and weak that a proper setting of the rangefinder particularly for telephoto lenses would not easily be possible. A telephoto lens must be set more precisely than a wide angle lens for since the conventional telephoto lens has four times as long a focal length as the conventional wide-angle lens it requires sixteen times as accurate a setting.

A primary object of the present invention is to provide a photographic camera having a coupled rangefinder in which a single eyepiece can be used for both the rangefinder and the viewfinder so that the subject can be viewed and the camera focused without the photographer having to shift his eye.

Another object of the invention is to provide a photographic camera which is adapted for use with interchangeable lenses of different focal lengths and which has a coupled rangefinder, in which a single eyepiece can be used for both rangefinder and viewfinder purposes.

Another object of the present invention is to provide a camera in which the viewfinder system is equipped with changeable magnification so that lenses of different focal lengths can be used in the camera, and still the definition of the images produced in the rangefinder will be sufficient for practical purposes.

A further object of the present invention is to provide a camera with means for automatically changing the magnification of the image area appearing in the viewfinder or eyepiece of the rangefinder in accordance with the particular objective lens mount being used on the camera, when attaching each lens mount to the camera.

Another object of the invention is to provide a camera having means for automatically adjusting the size of the image area and the magnification thereof appearing in the eyepiece of the rangefinder to correspond to the focal length of the selected photographic objective when the latter is attached to the camera.

Another object of the invention is to provide a viewfinder system which is automatically adjusted to the proper magnification for the focal length of the lens that is being used in the camera, when the objective amount for that lens is coupled to the camera.

A further object of the invention is to provide a photographic camera in which the magnification of the viewfinder and of the rangefinder is increased as the focal length of the lenses that are being used in the camera increases.

Another object of the invention is to provide a photographic camera of the character described having means for changing the magnification for lenses of different focal lengths, which will produce approximately the same size of image in the viewfinder regardless of the differences in focal length of the different objective lenses used in the camera. To this end it is a further object of the invention to provide a viewfinder system in which the size of image seen, when a telephoto lens is being used on the camera, is approximately doubled, and the size of image seen, when a wide angle lens is being used on the camera, is approximately halved, as compared with the size of image seen when a normal angle lens is being used on the camera.

A further object of the invention is to provide means for automatically adjusting the field of view angle for the interchangeable lenses used on the camera, when each different objective lens mount is coupled to the camera.

Another object of the invention is to provide a photographic camera in which means is provided for automatically adjusting the size of the field of view for the different focal length lenses used in the camera simultaneously with the adjustment of magnification, and simultaneously with coupling of an objective lens mount to the camera.

Other objects of the invention will be apparent hereinafter from the specification and from the recital of the appended claims.

In the drawings:

Fig. 1 is a front elevation of a camera constructed according to one embodiment of the present invention, the door at the rear of the camera being shown fragmentarily, also, and open;

Fig. 2 is a rear elevation on an enlarged scale of this camera, with the door shown fragmentarily and open, and with parts of the camera broken away to show portions of the frames which control the size and position of the image area appearing in the viewfinder or eyepiece of the rangefinder, the cams which control the frames and the deflecting mechanism, and the means for operating the lenses which control the magnification of the image appearing in the rangefinder;

Fig. 3 is a longitudinal section through the camera, on the scale of Fig. 2, showing an objective lens mount secured to the front of the camera and showing details of the optical system of a preferred type of rangefinder that may be used with the camera;

Figs. 4 and 5 are rear views on the same scale of different objective focusing mounts that may be used in the camera;

Fig. 6 is a fragmentary axial section on this scale of one of the photographic objective focusing mounts usable with the camera and showing how this mount is coupled to the gear, which actuates the mechanism that operates the magnifying mechanism, and to the cam, which controls the size of the image area;

Fig. 7 is a fragmentary side elevation of the objective focusing mount, on a somewhat reduced scale as compared with Fig. 6, and illustrating the means for limiting the locking movement of the objective focusing mount in coupling the mount to the camera;

Fig. 9 is a perspective view showing the barrel cam which operates the magnifying mechanism and the pinion which imparts rotation to the same;

Fig. 10 is a fragmentary rear elevation on an enlarged scale showing the magnifying mechanism and the means for actuating the same;

Fig. 11 is a section on the line 11—11 of Fig. 10 looking in the direction of the arrows;

Fig. 12 is a section from front to rear through the camera casing, taken on the line 12—12 of Fig. 14 looking in the direction of the arrows and showing the magnifying lenses of the rangefinder-viewfinder system in the position occupied when a normal angle objective lens mount is being employed on the camera;

Figs. 13, 14 and 15 are fragmentary views showing different positions of the magnifying lenses when different objective lens mounts are coupled to the camera, Fig. 14 showing also fragmentarily the rangefinder prism bar and its mounting;

Fig. 16 is a section on the line 16—16 of Fig. 14 looking in the direction of the arrows;

Figs. 17, 18 and 19 are diagrammatic views, corresponding to Figs. 13, 14 and 15, respectively, showing the rangefinder system and the different positions of the magnifying mechanism for different objective lens mounts used in the camera;

Fig. 20 is a section on an enlarged scale showing details of the rotary optical wedges of the deflecting system and their mounting;

Fig. 21 is a fragmentary view on an enlarged scale looking from the rear of the camera, showing the image masks and parallax frame, and the means for controlling the size and position of the image area that is seen in the viewfinder or eyepiece of the camera;

Fig. 22 is a fragmentary rear elevation further showing the structure of the two frames which define the area of image, and the guide which operates the same; and Fig. 23 is a fragmentary rear view, with parts further broken away, showing the base of the parallax mechanism, the parallax slide, and the cam and lever for operating the same.

Figure 8:
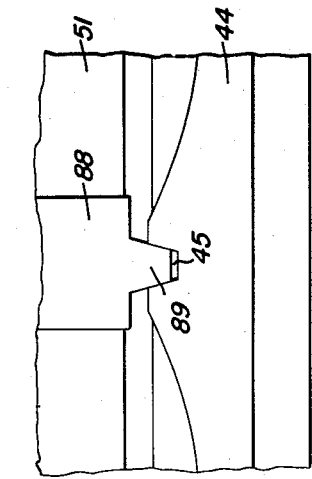
Fig. 8 is a fragmentary view looking at the inside of the barrel of the objective focusing mount and of the cam which controls the parallax and deflecting mechanisms of the camera and showing the means for coupling the objective focusing mount to this cam.

In the camera illustrated in the drawings, there are a series of four lenses in the viewfinder system mounted for movement between the eyepiece and the aligned front view of the camera. Two of these lenses form a pair movable together as a unit; and this pair is constantly interposed between the eyepiece and the front window, but is movable axially forward and back between the front window and the eyepiece. The other two lenses are mounted so as to be movable into and out of axial alignment with these first pair of lenses; and these other two lenses are so connected to one another that when one of them is in axial alignment with the first pair of lenses the other of them is out of alignment with this first pair, and out of alignment, too, with the window and eyepiece and is, therefore, in inoperative position. One of the second pair of lenses is disposed to be interposed between the front window and the first pair of lenses when it is moved to operative position; and the other of the second pair of lenses is disposed so as to be interposed between the first pair of lenses and the eyepiece when it is in operative position.

When a wide angle objective lens mount is being used on the camera, the first pair of lenses referred to above of the viewfinder system is in its forward axial position and the second described lens of the second pair is interposed between the first pair and the eyepiece. The optics of the viewfinder lenses are so selected that in this arrangement the image seen in the eyepiece will be reduced in size to about half the size of the image that would be seen if the lenses of the viewfinder system were not provided.

When a normal angle objective focusing mount is used on the camera, the second-named of the second pair of lenses of the viewfinder system is swung out of operative position, and the first-named of the second pair of lenses is swung into operative position. The first pair of lenses of the viewfinder system remain in their forward position. This arrangement produces an image approximately the same area as that produced by the disposition of the lenses of the viewfinder system when the wide angle objective focusing mount is being used on the camera.

When a telephoto objective focusing mount is used on the camera, the first-named of the second pair of lenses of the viewfinder system remains in operative position and the second-named of the second pair of lenses of the viewfinder system is out of operative position, but the first pair of lenses of the viewfinder system is moved to its rear position. This disposition of the lenses of the viewfinder system magnifies the image and produces an image very nearly the same area as produced with the arrangements of the viewfinder lenses for either wide angle or normal angle objective focusing mounts.

The lenses in the viewfinder system are automatically disposed in the correct positions for the particular objective focusing mount being used on the camera. A cam controls the movements of the several lenses of the viewfinder system; and gearing is provided in the camera for driving this cam. Each objective lens mount is adapted to be coupled to the camera by a bayonet lock; and each objective lens mount, except the wide-angle objective lens mount, has a pin on it that is adapted to engage and drive the cam drive gearing as the objective lens mount is being rotated to couple it by its bayonet lock to the camera. The driving pins in the normal angle and telephoto objective lens mounts are disposed, respectively, in different angular positions about the axes of their respective mounts so that a different amount of movement is imparted to the cam drive gearing and to the cam when the normal angle objective lens mount is being coupled to the camera from that imparted to the cam drive gearing and to the cam when the telephoto objective lens mount is being coupled to the camera. This difference in movement of the cam produces the different dispositions of the viewfinder lenses corresponding to the normal angle and telephoto objective lens mounts as described above. The normal position of the viewfinder lenses is that for use with the wide angle objective lens mount so that the fact that the wide angle objective lens mount effects no movement of the cam drive gearing or of the cam in being coupled to the camera makes no difference; when the wide angle objective lens mount is coupled to the camera the lenses of the viewfinder system are in correct position to modify (reduce) the size of the image as described above.

To enable the photographer to properly determine just what picture he is going to get with each of the objective lens mounts, it is desirable to frame the field of view of the image of the object being photographed; and since the area of the image will vary slightly with the different focal length objective lens mounts that may be used on the camera, the frame for the field of view in the present camera is made adjustable. To this end the frame is made in two parts that are movable relative to one another to provide the correct area of field of view for the particular objective lens mount being used on the camera. To effect adjustment of the frame parts, the first gear of the cam drive gearing referred to above is provided with an integral cam portion which is operatively connected to the frame parts. The normal position of the frame parts is that corresponding to the wide angle objective lens mount. When either the normal angle or the telephoto objective lens mount is being coupled to the camera, the pin which it carries drives the first gear of the cam drive gears causing the cam portion of said first gear to cause the frame parts to be moved relative to one another, thereby adjusting the opening of the frame for the field of view. Since the drive pins are in different angular positions on the normal angle and telephoto objective lens mounts, respectively, as already described, the frame parts will be shifted relative to one another differently for normal angle and telephoto objective lens mounts, respectively. Thus, for each objective lens mount the frame will frame the proper area corresponding to the field of vision; and it will frame this area automatically and simultaneously with the movement of the magnifying lenses of the viewfinder system.

In the camera shown in the drawings, the rangefinder comprises a deflecting device, and a thin glass bar or prism, one end of which is positioned behind the deflecting device. The deflecting device comprises preferably a pair of relatively rotatable coaxial optical wedges positioned behind a front window in the camera, other than the front window heretofore mentioned, and the optical wedges are adapted to be coupled to each objective lens mount when the lens mount is coupled to the camera. The thin glass bar or prism extends across the camera and behind the window heretofore mentioned, being interposed between that window and the lenses of the viewfinder system. The two ends of this glass bar or prism are parallel; and it is the thin end of the glass bar or prism that is positioned in alignment with the viewfinder lenses. The glass bar or prism is made just long enough for its thin end to extend only to the center of the window that is in front of it. A second prism is cemented to the glass bar at its thin end. This second prism lies behind the other half of the viewfinder window and acts really as a window pane through which the rays of light from the object pass directly to the viewfinder system. Between the two prisms there is cemented a gold mirror which reflects the rays, that are transmitted by the glass bar from the deflecting device, to the viewfinder system. The thin end of the glass bar is made just wide enough to reflect the image of a wide angle objective lens.

The glass bar enables positioning the negative components of the viewfinder system close to the aligned front window of the camera, making it practical to combine the rangefinder and viewfinder systems. If the viewfinder system could not be disposed close to the aligned window, the window opening with the image framing would not give a full sized view at the eyepiece of the field of view; hence the viewfinder and rangefinder could not be combined. The glass bar makes feasible combined rangefinder-viewfinder systems with a common eyepiece, Referring now to the drawings by numerals of reference, 30 denotes the casing of the camera. The camera casing 30 has window openings in its front wall for the windows 31 and 32 (Figs. 1 and 17 to 19) through which the subject, that is to be photographed, is viewed in the rangefinder. Window 32 serves also as a window through which the subject may be viewed in the viewfinder or eye-piece 34 of the camera (Figs. 12, 14, 17, 18 and 19).

Window 31 is circular and is mounted in a holder or frame 33 (Figs. 3 and 20) which is secured in an aperture in the camera casing 30 as will be described further hereinafter. Window 32 is mounted in a frame 39 (Figs. 1 and 3) that is secured by screws 43 to the camera casing. This frame also carries a circular window 46 which is used in conjunction with an exposure identifying mechanism that forms no part of the subject matter of the present invention. Eye-piece 34 is held by a nut 48 (Figs. 12 and 14) in a mounting ring 49 that threads into an opening in the rear of the casing 30. The eye-piece 34 is mounted in the rear wall of the camera casing in axial alignment with the window 32.

The camera casing also has an opening 35 (Fig. 1) in its front wall in which the objective lens mount, that is to be used with the camera, is mounted. Surrounding the opening 35 is a collar 36. This collar is secured to the camera casing by screws 37. It has a peripheral flange or rib 38. Rotatably mounted in the collar 36 and threaded into it is the sleeve portion 40 (Fig. 6) of a rotary control cam 41. Sleeve portion 40 has riveted to it at its inside, as denoted at 42 (Figs. 1 and 2), a spring ring 44 which is provided at a point diametrically opposite the rivets 42 with a recess 45 (Fig. 8).

Figure 1:
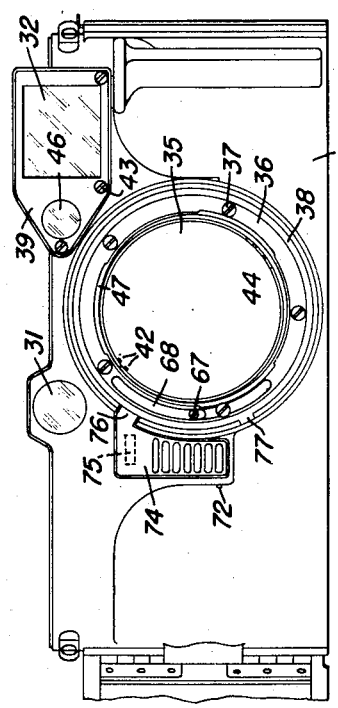

Integral with the collar 36 are three equiangularly spaced lugs 47 (Fig. 1). These form part of a bayonet lock by which each objective focusing mount, which is used on the camera, may be coupled to the camera.

Objective focusing mounts used with a camera constructed according to the present invention may be of conventional construction so far as the lens systems of the objective focusing mounts are concerned. Suffice it to say that the lens system of each objective mount is carried in a barrel 50 (Figs. 3 and 6) that is mounted in a sleeve 51 which threads externally on the barrel and which threads internally into a sleeve 52. Sleeve 52 is provided for adjustment of the objective focusing mount in the factory. It may be fixedly secured to the sleeve 50 after adjustment. The front end of the sleeve 51 may be beveled off in conventional manner and graduated to read against an index mark or graduation on the periphery of the barrel 50. Threaded on the sleeve 52 but fixedly secured thereto is the focus adjusting sleeve 54.

As already indicated, objective focusing mounts of different focal lengths may be used interchangeably on the camera as, for instance, mounts for wide angle, normal angle, and telephoto lenses.

The manner of coupling an objective focusing mount to the camera and to the cam 41 is shown in Figs. 4, 5, 6 and 8 together with Fig. 1. Each objective focusing mount is coupled to the camera by a bayonet lock. The three equi-angularly spaced lugs 47 of collar 36 form one part of this lock. The sleeve member 54 of each objective focusing mount is formed with a ring portion 56 (Figs. 4, 5 and 6) that is provided with three equi-angularly spaced lugs 60 that project radially inwardly. These are separated from one another by three arcuate recesses 61. The alternate lugs and recesses 60, 61 form the other part of the bayonet lock whereby each objective focusing mount may be removably secured to the camera casing.

Figure 2:
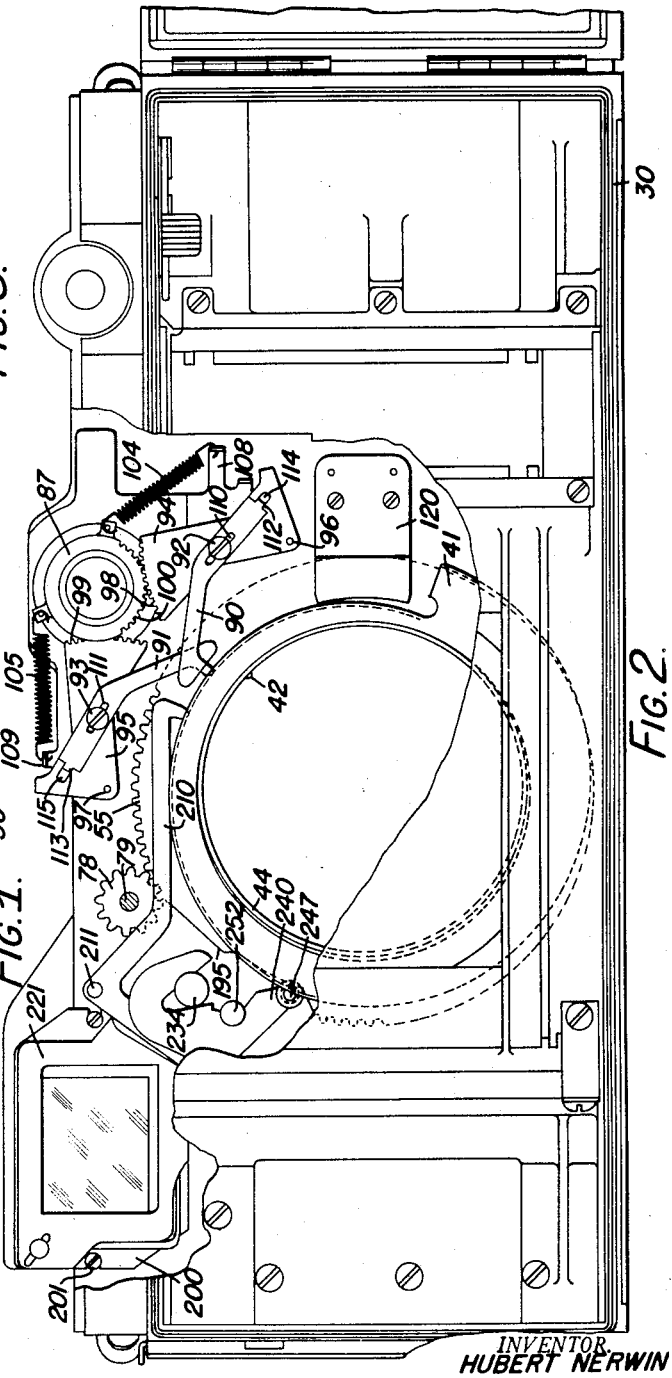

Journaled on the collar 36 (Figs. 1 and 6) coaxial with the cam 41 is an interrupted gear 55 (Figs. 2, 6 and 21).

Mounted in the rear face of the sleeve 54 of each objective focusing mount, except for one (preferably the one for the shortest focal length lens) is a pin 65 (Figs. 4, 5 and 6). The pin 65 in each different objective focusing mount, except for the one, is located at a different angular position about the axis of the objective focusing mount as will be seen by comparison of Figs. 4 and 5 which show two different objective focusing mounts as, for instance, mounts for normal angle and for telephoto lenses.

Each pin 65 is adapted to engage a pin 67 (Fig. 6) which is secured in the gear 55. The pins 65 and 67 extend through registering arcuate slots 68 and 69 in the collar 36 and casing 30, respectively, to engage one another.

The pins 65 of the different objective mounts, which have pins 65, are, as stated, arranged in different angular positions around the axes of their respective mounts so that, when rotating these different objective focusing mounts to couple them by means of the bayonet lock connection to the camera housing, the different mounts will be rotated different amounts before their respective pins 65 engage pin 67. Hence, in coupling different objective focusing mounts, as, for instance, wide angle, normal angle, and telephoto objective lens focusing mounts, to the camera, the gear 55 will be rotated not at all, for the wide angle focusing mount, for instance, and different amounts, respectively, for the other focusing mounts.

The sleeve 54 of each objective mount has a skirt portion 70 (Fig. 7) which has an arcuate slot 71 therein. Pivotally mounted by means of a pin 72 (Figs. 1 and 6) in a recess in the front wall of the camera casing is a detent 74. This detent is pressed forwardly by a leaf spring 75 which is interposed between the detent and the front face of the casing. When an objective focusing mount is being coupled to the camera by the bayonet lock connection, the skirt 70 of the objective focusing mount rides over the finger 76 of the detent, depressing the detent. Each objective mount can be rotated in the bayonet lock connection of the camera casing until one of the bounding walls of the slot 71 comes into engagement with a stop lug 77 (Fig. 1) that is integral with the peripheral rib 38 of the collar 36. Immediately after the skirt 70 has passed over the finger 76 of the spring detent 74, the finger 76 snaps back into position to lock the objective focusing mount against rotation in one direction, while the stop lug 77 locks it against rotation in the other direction. Thus, the bayonet lock connection holds each objective focusing mount to the camera casing.

To remove an objective focusing mount from the camera housing, spring finger 74 is depressed, and the objective focusing mount is rotated to align the lugs 60 of the mount with the spaces between the lugs 47 of the camera casing. Then the objective focusing mount is withdrawn axially.

The gear 55 meshes with a pinion 78 (Figs. 2, 9, 14 and 21) which is fastened to a shaft 79 to which is secured a barrel cam 80. The cam 80 controls the movement of the magnifying lenses of the viewfinder system as will be described further hereinafter.

The rangefinder of the camera may be of any conventional or suitable construction, but for the reasons already given and which will appear hereinafter I prefer to use the novel rangefinder herein described and which is illustrated in the accompanying drawings.

The deflecting mechanism of this rangefinder might comprise a pivoted reflector coupled to the objective lens mount. Preferably, however, I employ a pair of axially-aligned, relatively-rotatable, circular optical wedges 81 and 82 (Fig. 20) of conventional construction. These wedges are mounted behind the window 31, the wedge 81 being secured in a ring 83, and the wedge 82 being secured in a ring 84. Ring 83 is adjustably threaded in a sleeve 85 that threads rotatably for axial movement in a clamping ring 86 by which window mount 33 is secured in the casing. Ring 84 is adjustably threaded into a sleeve 87 which is threaded rotatably for axial movement in sleeve 85.

For effecting the rotary movement of the optical wedges, each objective lens mount used on the camera is coupled, when used, to the deflecting mechanism. To this end there is formed integral with the sleeve 51 of each objective lens mount a dog or lug 88 (Figs. 4, 5 and 8) which projects rearwardly from the objective lens mount. Each dog or lug 88 is formed with a finger 89 which is adapted to engage in the recess 45 of ring 44 (Figs. 1, 2 and 8) thereby to couple the sleeve 51 of the objective focusing mount to the control cam 41 so that the control cam 41 may be rotated upon focusing adjustment of the objective focusing mount.

The cam 41 operates the deflecting mechanism of the rangefinder through a pair of levers 90 and 91 (Fig. 2) which are adjustably connected by studs 92 and 93, respectively, with lever arms 94 and 95, respectively. These lever arms are pivotally mounted in the front wall of the camera casing on pins 96 and 97, respectively. They have toothed segments 98 and 99, respectively, integral therewith. The toothed segments engage coaxial segmental gears, of which one is shown at 100, that are formed integral with the sleeves 87 and 85 (Fig. 20), which are rotatable on one another and which carry the two optical wedges. Coil springs 104 and 105 (Fig. 2) serve to take up the backlash in the gearing and to hold the levers 90 and 91 in engagement with the cam 41. These springs engage at one end, respectively, with lugs 106 and 107 (Fig. 20), respectively, that are integral with the respective lens-carrying sleeves. At their other ends the two springs engage, respectively, lugs 108 and 109 (Fig. 2) that are fixed to the camera casing. The levers 90 and 91 are adjustable on the arms 94 and 95, respectively. To this end, the levers are slotted as denoted at 110 and 111, respectively, and have downturned ends 112 and 113, respectively, that engage in slots 114 and 115, respectively, formed in the arms 94 and 95, respectively. For a more detailed description of the deflecting system of the camera reference may be had to my copending application Serial No. 291,441, filed June 3, 1952, now Patent No. 2,811,908.

A stop 120 (Fig. 2) is secured in the casing to limit the rotary movement of the cam 41 by engaging with a stop surface on the cam.

In the embodiment of the invention shown, the optical wedges are adapted to cooperate with a glass bar or prism 125 (Figs. 3, 10, 14, 17, 18 and 19) that has two 45° angular surfaces 126 and 127 at opposite ends that are parallel. A compensation prism 128 is cemented to the prism 125 on its right hand end at the front thereof. This compensation prism 128, which is aligned axially with the optical wedges 81 and 82, acts to correct for errors in the prism 125 and may be adjusted angularly in the factory and then cemented permanently to the prism 125 in adjusted position. A prism 130 is cemented at the left hand end of the prism 125. This acts really as a window pane in front of the eyepiece 34. A small gold-backed reflecting mirror 131 (Fig. 16) is secured to the small end of the prism 125 by the prism 130.

One image of the object, which is to be photographed, passes through window 31, reflecting system 81—82, into glass bar 125. It is reflected by surface 126 of the prism 125 onto mirror 131, and is reflected by mirror 131 to the eyepiece through the viewfinder system. Another image of the object passes through window 32, prisms 130 and 125, and the viewfinder system to the eyepiece. By focusing adjustment of each objective lens mount in conventional manner through rotation of adjustment sleeve 54 (Figs. 3 and 6) the two images can be brought into alignment to put the mount in focus.

The glass bar 125 is made so small and thin that at its right hand end 126 it is only wide enough to cover the reflected image for the field of view of a wide-angle lens.

This makes it possible, as already stated, for the viewfinder system to come close enough to the optical prisms 125 and 130 to cover a viewfinder angle for wide angle lenses; and it makes the combined viewfinder-rangefinder system with a common eyepiece 34 practical. It also permits keeping the front to back dimension of the camera relatively small.

Prism bar 125 is mounted at its larger end in a clip 132 (Fig. 3). This clip is held on a boss 151 (Fig. 10), that is integral with a horizontal partition wall 141 of the camera casing, by a screw 134. At its opposite end the prism 125 is mounted in a pair of channel strips 133 (Figs. 3, 14 and 16) that are held against a seat 161, which extends vertically in the camera casing, by a gib 139 (Fig. 14) which is held in place by screws 144. Channel strips 133 also hold prism 130.

Between the front window 32 and the eyepiece 34 there are mounted the magnifying lenses of the rangefinder-viewfinder system. These are to vary the size of the image of the object being photographed in accordance with the focal length of the objective lens being used in the camera. They are to maintain, as already explained, an approximately uniform size image regardless of the objective focusing mount used. These magnifying lenses include two plano-convex lenses 135 and 136, and two plano-concave lenses 137 and 138 (Figs. 12 to 15 and 17 to 19).

Pivotally mounted by means of a pin 140 (Fig. 10) in a generally horizontal partition wall 141 formed in the camera casing is a lever 142. This lever carries intermediate its ends a pin or follower 143 that engages in the track 145 (Fig. 9) of the cam 80. The lever 142 is bent upwardly and rearwardly, as shown in Figs. 10, 14 and 15. It has a forked free end as denoted at 146. The forked end of the lever engages a pin 147 which is secured in one end of one arm of a bell-crank lever 148. The lens 136 is secured by means of a mount 154 in the other arm of this bell-crank lever 148. This bell-crank lever is pivotally mounted by means of the stud 149 in an arm 150 which projects from one side of a support 152 that is fastened to the partition wall 141. The bell-crank lever 148 has a notch 155 (Fig. 14) in it which is radial of the pivot pin 149 and which engages a pin 156 that is secured in a triangular shaped plate 158 that is pivoted by means of the stud 159 in the partition wall 141.

The lens 135 is carried by means of a mount 165 on an arm 166 (Fig. 13) that is pivotally mounted by means of a stud 167 in the partition wall 141. The arm 166 has a slot 168 in it radial of its pivot 167 that engages a pin 169 which is carried by the plate 158.

It will be seen, then, that when arm 142 is oscillated by the cam 80 (Fig. 9), the lever 148 carrying lens 136 will be swung on its pivot 149 and the plate 158 will be swung on its pivot 159 by engagement of the pin 156 of the plate 158 in the slot 155 of lever 148, and that in turn the arm 166 will be swung on its pivot 167 by reason of the engagement of the pin 169 of plate 158 in the slot 168 of the arm 166. As a result, when the lens 135 is positioned between the window 32 and the eyepiece 34, the lens 136 carried by mount 154 will be swung out of registry with the window and eyepiece, and vice versa, when the lens 136 is in registry with the window and eyepiece, the lens 135 will be out of registry with the window and eyepiece.

Different positions of arm 142 and of the lens-supporting arms 148 and 166 are shown in Figs. 12, 13, 14 and 15. Figs. 12, 13 and 17 show the respective positions of the lenses 135 and 136 when a wide angle objective focusing mount is secured in the camera. Figs. 11, 14 and 18 show the positions of the lenses when a normal angle objective focusing mount is secured in the camera; and Figs. 15 and 19 show the positions of the lenses 135 and 136 when a telephoto objective focusing mount is secured to the camera.

Mounted in the support 152 are two parallel rods 175 and 176 (Figs. 10, 13, 14 and 15). Mounted to slide on these rods is a slide 177 which carries at one side thereof the lens holder 178. The lenses 137 and 138 are mounted in the lens mount 178 (Fig. 12).

The slide 177 is mounted to travel on the bars 175 and 176 forwardly and backwardly. The slide is actuated by an arm 180 which is pivotally mounted at one end on the stud 181 secured in a boss 182 (Fig. 10) formed upon the partition wall 141. This arm carries intermediate its ends a pin or follower 183 which engages in the track 145 (Fig. 9) of the cam 80 at a point diametrically opposite the point of engagement of pin 143 therewith. At its free end the lever 180 is forked, being provided with a slot 185 (Fig. 14) that engages a stud 186 which is secured in slide 177.

Upon rotation of cam 80, then, it will be seen then that lens-carrying slide 178 can be moved forward and backward. Figs. 12, 13 and 17 show the position of slide 178 when a wide angle objective lens mount is secured on the camera. Figs. 11, 14 and 19 show the position of slide 178 when a normal angle objective lens mount is coupled to the camera; and Figs. 15 and 19 show the position of the lens-carrying slide 178 when a telephoto objective lens mount is coupled to the camera.

Fig. 2 shows one extreme position of the interrupted gear 55. This position is that of the gear when a wide angle objective focusing mount is secured in the camera. This mount carries no pin 65 (Figs. 4 and 5) and imparts no movement to the gear when it is being coupled to the camera.

When the normal angle focusing mount is secured in the camera, the pin 65 carried thereby engages the pin 67 (Fig. 6) and rotates the gear 55 through a slight angle to cause the pinion 78 and cam 80 (Fig. 9) to be revolved. This causes the inclined portion 187 of cam track 145 to rotate into engagement with pin 143, causing lever 142 (Fig. 10) to be swung about stud 140. This moves the lens 135 into operative position between the window 22 and the eyepiece 34 and simultaneously moves the lens 136 out of operative position. While this is occurring pin 183 moves in the dwell portion 188 of cam track 145, and no movement of lever 180 occurs. Therefore slide 177 and lens holder 178 remain stationary with lenses 137 and 138 in their forward positions as shown in Figs. 11, 14 and 18. An image is produced, therefore, in the rangefinder which is of the desired size.

When the telephoto lens is mounted on the camera, the pin 65 (Fig. 5) of its focusing mount rotates the pin 67 (Fig. 6) and gear 55 through a larger angle to the extreme position of Fig. 21. The inclined portion 187 (Fig. 9) of cam track 145 now moves into engagement with and actuates pin 183 while pin 143 travels in the dwell portion 188 of the cam track. As the pin 183 travels in the inclined portion of the cam track the lever 180 is rocked about stud 181 to move the slide 177, causing the lenses 137 and 138 to be moved rearwardly. Lever 142 remains stationary, however, and lens 135 therefore remains in operative position as shown in Figs. 15 and 19. Lenses 137 and 138 in their rearward positions increase, in conjunction with the lens 135, the magnification of the images seen through the rangefinder and make them large enough to permit of precise focusing.

Besides changing the magnification of the images seen in the eyepiece, with change in the lens which is employed on the camera, it is desirable to change simultaneously the area of the image to correspond to the size of picture which is to be taken through the particular objective mount being used on the camera. To this end the interrupted gear 55 is provided with a short peripheral cam section 195 (Figs. 2 and 21) that has a dwell portion 196, a steep rise 197, and a longer, more gentle rise 198. Mounted directly behind the window 32 is a base plate 200 (Fig. 23) which is secured to the inside of the front wall of the camera casing by screws 201 (Fig. 2), which engage in slots 202 (Fig. 23) in the base plate. The base plate constitutes part of the image area framing mechanism of the camera and has a rectangular opening 205 therethrough indicated in dotted lines in Fig. 23.

Mounted to slide on the base plate 200 is a parallax slide 204. The parallax slide 204 constitutes a further part of the image area framing mechanism of the camera and has a rectangular opening 206 therethrough that registers with the opening 205 in the base plate 200. The slide 204 is mounted to slide on the base plate 200 in a direction diagonal of the two openings 205 and 206, being guided in its movement by headed studs 207 which are riveted to the base plate and whose stem portions pass through slots 208 in the slide 204.

The slide is actuated by a bell-crank lever 210 which is pivotally mounted intermediate its ends by means of a stud 211 on the base plate 200. This lever is connected to the slide 204 by means of a stud 212 that is riveted in the slide and that engages in a slot 213 formed in one arm of the lever. The lever is formed at its opposite end with a follower portion 214 which engages in the track 215 (Fig. 6) of the cam 41. This cam is adapted to be coupled, as previously described, to each objective focusing mount used on the camera so that as a mount is adjusted in focusing the cam will be rotated to effect movement of the parallax slide 204 through the lever 210.

Mounted on the parallax slide is a lower mask 220 (Fig. 22) and mounted upon the lower mask 220 is an upper mask 221. The lower mask 220 is generally U-shaped and bounds a rectangular opening such as indicated at 222 in Fig. 22. The upper mask 221 is generally rectangular in shape and has a central rectangular opening 223 therethrough. The masks 220 and 221 constitute further parts of the image area framing mechanism of the camera; and the openings therein register with the openings 205 and 206 in the base plate 220 and the parallax slide 204, respectively.

The masks 220 and 221 are secured to the parallax slide 204 and guided thereon by a headed stud 224 and by headed stud 212. The stud 224 is riveted in the parallax slide 204. It engages in aligned slots 226 and 227 in the upper left hand corners of the two masks. The stud 212 engages in aligned slots 228 and 229 formed in the lower right hand corners of the two masks. The slots 226, 227, 228, 229 extend diagonally of the openings 222 and 223 it the two masks.

The two masks are adapted to be shifted relative to one another to vary the size of the image area seen in the eyepiece of the camera in accordance with the focal length of the objective focusing mount used on the camera. They are shiftable as each objective focusing mount, except one (preferably the one for the shortest focal length lens) is coupled to the camera.

The movement of the masks 220 and 221 relative to one another is effected by a guide 230. This guide is pivotally connected to the upper mask 221 by a pin 231. It is pivotally connected to the lower mask 222 by a pin 232. It is connected to lever 210 by the headed stud 212. It carries a headed stud 234 which has a shank 235.

The guide 230 is adapted to be rocked about its pivot 212 by a hook member 240 (Fig. 21) which is pivoted by means of a stud 241 on the base plate 200. This stud is secured in a hole 246 (Fig. 23) in a tab 242 that is integral with the base plate at one lateral edge thereof, and that extends over the base plate parallel to the base plate. A spring 243, that is connected at one end to a second tab 244 formed on the base plate, and that is wound around the pivot 241, and that engages at its other end with a stud 245, which is riveted to the hook member 240, serves to urge the hook member 240 continuously counter-clockwise, as viewed in Fig. 21.

The hook member carries a roller 247 which is adapted to engage with the cam track 195 of the gear 55.

The hook member 240 is formed with an arcuate surface 248 concentric with pivot 241 and defined by two substantially radial walls 249 and 250. A headed stud 252, which is secured in the base plate 200, has its shank portion riding on the arcuate surface 248. This stud is adapted to engage the walls 249 and 250 to limit the swinging movement of the hook member 240. The hook member is also formed with two converging surfaces 253 and 255. A coil spring 256, which is fastened at one end to the stud 257, that is riveted in the guide 230, and which is hooked at its other end over the lever 210 serves to constantly urge the guide about its pivot and to constantly urge the shank 235 of the stud 234 toward engagement with the guide or cam surface 255 of the hook 240.

Fig. 2 shows the gear 55 in its zero position, which is the position it occupies when either the wide angle focusing mount is attached to the camera or there is no focusing objective mount attached to the camera. Here the hook 240 is rocked on its pivot 241 to one limit position against the stop pin 252.

In coupling a wide angle objective mount to the camera no motion will be transmitted to the gear 55 because this objective focusing mount carries no pin 65 (Fig. 4). Hence, the hook member 240 will be held in the position shown in Fig. 2. The hook is rocked counter-clockwise about pivot 241 by spring 243, but the spring 256 holds the shank 235 of the stud 234 in engagement with the guide surface 255.

When a normal angle objective lens mount is being attached to the camera by the bayonet lock, the gear 55 will be rotated by engagement of pin 65 (Fig. 4) with pin 67 (Fig. 6), the amount of such rotation being determined by the position of the pin 65 in the objective mount. In this rotation, the roller 247 will ride along the dwell 196 in the cam portion 195 of the gear 55 and up onto the rise 197 of that cam portion. This will cause the hook member 240 to be rocked about its pivot 241 and will change the angular position of the guide surface 255 of the hook member. This will rock the guide 230 and will cause the masks 220 and 221 to be shifted slightly relative to one another to effect the slight change in initial size of the area of the frame opening to conform to that corresponding to the normal angle lens.

When a telephoto lens is being connected to the camera through the bayonet lock coupling a greater amount of movement will be imparted to the gear 55, than in the case of the normal angle lens mount, because of the different angular position of the pin 65 (Fig. 5) of the telephoto objective lens mount about the axis of the lens mount. In the case of the telephoto lens mount, the roller 247 will be moved up onto the portion 198 of the gear 55 to the position shown in Fig. 21 so that the guide surface 255 of hook mmeber 240 rocks the guide 230 to a different position causing masks 220 and 221 to provide a different size of frame opening, a size corresponding to the zero position of adjustment of the telephoto lens.

As each objective lens mount is adjusted in focusing, the cam 41 will be rotated. This will cause the long arm of the lever 210 to be rocked upwardly about its pivot 211. This shifts the parallax slide 204 diagonally downward on the base plate 200, thus shifting the position of the image area in the viewfinder or eyepiece 34 toward the axis of the cam 41 and of the objective lens focusing mount, as described more particularly in my pending application Serial No. 288,511, filed May 17, 1952, now Patent No. 2,719,454. Since in the position shown in Fig. 2, the surface 255 of the hook member 240 is but slightly inclined to the moving direction of the masks 220 and 221 a slight movement will be imparted to the guide 230 and the masks 220 and 221 during focusing adjustment of the wide angle objective mount. This movement, however, not only changes the position of the image area, but at the same time slightly modifies the size of the image area. The size and position of the image area is corrected, therefore, during focusing to correct for parallax and in accordance with the adjusted focal length of the adjusted objective mount.

When a normal angle objective lens mount is secured to the camera, the guide surface 255 of the hook member will be more inclined to a line radial of the axis of the cam 41 in the position to which the hook member 240 is shifted. Hence, as the lever 210 rocks on its axis on rotation of the cam 41 during focusing adjustment of the normal angle objective lens mount, the masks 220 and 221 will be shifted slightly more relative to one another during focusing adjustment of the normal angle lens than was the case when the wide angle lens was connected with the camera. As the cam 41 is rotated in focusing, therefore, it will not only shift the parallax slide 204 but will also shift the masks 220 and 221 to change the position and size of the image area to provide the proper correction in size and position of the image area to conform to the adjusted focal length of the normal angle lens.

Also, since the guide surface 255 is differently inclined to the diagonal slots 226, 227, 228 and 229, when a telephoto objective lens mount is secured to the camera, a different component of movement will be imparted to the masks 220 and 221 as the lever 210 is rocked by the cam 41 upon focusing adjustment of the telephoto lens mount. Thus a different component of movement will be imparted to the masks 220 and 221 as the cam 41 is rotated in focusing the telephoto objective lens mount from that imparted by the cam 41 to the masks during focusing of the normal angle lens mount. The movement of the masks together with the movement of the parallax slide 204 will provide not only the proper correction for the parallax but will also provide the proper change of size of the image area as the telephoto objective lens mount is focused.

While the construction and operation of the combined rangefinder-viewfinder system of the present camera will be apparent from the preceding description it may be summed up briefly here.

When an objective lens mount, other than the wide-angle lens mount, is being coupled to the camera, pin 65 (Figs. 4 and 5) of the lens mount will rotate gear 55 (Figs. 2 and 21). This will drive cam 80 (Fig. 9). The amount of rotation of cam 90 will be greater during coupling of the telephoto objective lens mount to the camera than during coupling of the normal angle objective lens mount to the camera. Since cam 80 controls levers 142 and 180 (Fig. 10) lever 166 (Fig. 13) and lens mount 178 will occupy different positions after the telephoto objective lens mount is coupled to the camera than the positions they occupy after the normal angle objective lens mount is coupled to the camera; and these positions will be different from the zero positions occupied by lever 166 and of lens mount 178 when the wide angle objective lens mount is coupled to the camera. As a result when the wide angle objective lens mount is coupled to the camera the lenses 135, 137, 138, 136 of the viewfinder system will occupy the positions shown in Fig. 17; when the normal angle objective lens mount is coupled to the camera these lenses will occupy the positions shown in Fig. 18; and when the telephoto objective lens mount is coupled to the camera these lenses will occupy the positions shown in Fig. 19.

Also, as the gear 55 is rotated during the act of coupling the normal angle and telephoto objective lens mounts to camera, cam portion 195 (Figs. 2 and 21) of the gear will cause shifts of masks 220 and 221 (Figs. 21 and 22) to vary the image frame opening in accordance with the particular lens mount being coupled to the camera and from the image frame opening prevailing when the wide angle lens is coupled to the camera. The amount of movement of the masks is slight, however, because with the changeable magnification of the viewfinding lens system described the image area remains almost constant regardless of the particular type objective lens mount which is secured to the camera.

The prism bar 125 serves to connect optically the deflecting device (wedges 81 and 82, Fig. 20) and the viewfinding system. One image of the object can be viewed through the eyepiece 34, the lenses of the viewfinding system, and window 32 directly and the other image of the object is transmitted through the window 31, the rotary optical wedges, the correction prism 128, the glass bar 125, the gold-backed half mirror 131 (Fig. 16), and the lenses of the magnifying system to the eyepiece 34.

In order to avoid having too large a camera, the prism bar 125 is provided. This prism is made so small and so thin that the variable magnifying mechanism of the camera can be brought quite close to the front window of the camera. This prism bar is thin enough to provide room for the optical viewfinder system behind it which has to cover the wide angle field for the short focal length lens.

In the camera of the present invention the viewfinder and the rangefinder are combined with one eyepiece and the field angle is automatically adjusted for the interchangeable lenses used in the camera.

While the invention has been described in connection with a particular embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A photographic camera having a viewfinding system and a coupled rangefinding system, a single viewing eyepiece for both systems, means for detachably securing to said camera selectively any one of a number of interchangeable focusing mounts for photographic objectives of different focal lengths, means for automatically coupling the rangefinder system to each of said focusing mounts during attachment of the focusing mount to the camera whereby the rangefinder system will be operated upon focusing adjustment of the focusing mount, adjustable optical means for varying the magnification of the image seen in said eyepiece, separate adjustable means for framing the image area seen in said eyepiece, a gear rotatable by an objective focusing mount during attachment of the objective focusing mount to said camera for actuating said optical means to vary automatically the magnification of said image in accordance with the focal length of said objective focusing mount, and a cam secured to said gear to rotate therewith and separately operatively connected to said framing means to adjust said framing means automatically also and simultaneously with the adjustment of said optical means and also in accordance with the focal length of said objective focusing mount.

2. A photographic camera having a viewfinding system and a coupled rangefinding system, a single viewing eyepiece for both systems, means for detachably securing to said camera selectively any one of a number of interchangeable focusing mounts for photographic objectives of different focal lengths, means carried in part by each focusing mount for coupling the rangefinder system automatically to each of said focusing mounts during attachment of the focusing mount to the camera whereby the rangefinder system will be operated upon focusing adjustment of the focusing mount, adjustable optical means for varying the magnification of the image seen in said eyepiece, separate adjustable means for framing the image area seen in said eyepiece, a member rotatable by the focusing mounts through different angles during attachment of the different focusing mounts to the camera, means connecting said member to said optical means to adjust said optical means automatically in accordance with the angle of rotation of said member, and separate means connecting said member to said adjustable framing means to adjust said framing means also automatically and simultaneously with the adjustment of said optical means and also in accordance with the angle of rotation of said member, whereby the framed image area is varied and the magnification of the image is varied, in accordance with the focal length of the objective focusing mount attached to the camera.

3. A photographic camera having a viewfinding system and a coupled rangefinding system, an eyepiece for both said systems, said rangefinding system including a movable light-deflecting member, means for detachably securing to said camera by rotary movement selectively any one of a number of interchangeable focusing mounts for photographic objectives of different focal lengths, a first rotary member connected to said light-deflecting member to move said light-deflecting member on rotation of said first rotary member, means for automatically coupling said first rotary member to each of said focusing mounts coaxially therewith during attachment of the focusing mount to the camera whereby said rotary member will be rotated upon focusing adjustment of the focusing mount, adjustable optical means for varying the magnification of the image seen in said eyepiece, a pair of relatively movable framing members for framing the image area seen in said eyepiece, a second rotary member coaxial with the first rotary member and rotatable by the focusing mounts respectively through different angles during attachment of the different focusing mounts to the camera, means connecting said second rotary member to said optical means to adjust said optical means automatically in accordance with the angle of rotation of said second rotary member, and means connecting said second rotary member to said framing members to adjust said framing members relative to one another automatically and simultaneously with the adjustment of said optical means and in accordance with the angle of rotation of said second rotary member, whereby the framed image area is varied, and the magnification of the image is varied in accordance with the focal length of the objective focusing mount attached to the camera.

4. A photographic camera according to claim 3 having means also connecting said first-named rotary member to said framing members to adjust said framing members relative to one another in a direction radial of the common axis of the rotary members and of the attached focusing mount upon rotation of said first rotary member, whereby to compensate for parallax.

5. A photographic camera according to claim 3 wherein the first rotary member is a cam, the second rotary member is a gear that has a second cam secured thereto coaxial therewith, said gear is connected through gearing with said optical means to adjust said optical means on rotation of said gear, and the means for connecting said second rotary member to said framing members includes said second cam.

6. A photographic camera according to claim 4 wherein the first rotary member is a cam, the second rotary member is a gear that has a second cam secured thereto coaxial therewith, said gear is connected through gearing with said optical means to adjust said optical means on rotation of said gear, and the means for connecting said second rotary member to said framing members includes said second cam.

7. A photographic camera having an optical rangefinder system including a movable deflecting member, a viewfinder system, a single eyepiece for both systems, means for adjusting the size and magnification of the image appearing in the viewfinder system, means for shifting the position of said image and for moving said deflecting member, rotatable control means for controlling said adjusting means, separate rotatable control means for said shifting means mounted coaxially of the first-named control means, means for detachably securing to said camera selectively coaxially of said control means any one of a plurality of different objective focusing mounts of different focal lengths and for simultaneously coupling each focusing mount to the second-named control means, and means carried by each of said focusing mounts, except one, for rotating said first-named control means during attachment of the focusing mount to the camera, said last-named means being differently positioned on each focusing mount, except said one, so that the amount of rotation imparted to said first-named control means as each focusing mount is attached to the camera is different.

8. A photographic camera having an optical rangefinder system including a movable deflecting member, a viewfinder system, a single-eyepiece for both systems, adjustable image framing means, means including a rotary cam for moving said deflecting member and for shifting the position of said image framing means, adjustable optical means for varying the magnification of the image, means for varying the size of said framing means, a rotary control member for actuating said adjustable optical means and said last-named means, said control member being journaled in the camera coaxially of said cam, means for detachably securing by relative rotary movement to said camera selectively coaxially with said cam and said control member any one of a plurality of different objective focusing mounts of different focal lengths, means carried by said control member engageable with a cooperating member on different focusing mounts to cause said control member to be rotated during attachment of the said different focusing mounts to the camera, and means for coupling said cam to each focusing mount during attachment of the focusing mount to the camera, whereby said cam is rotated on focusing adjustment of each mount.

9. A photographic camera having an optical rangefinder system including a movable deflecting member, a viewfinder system, a single eyepiece for both systems, adjustable image framing means, means including a rotary cam for moving said deflecting member and for shifting the position of said image framing means, adjustable optical means for varying the magnification of the image, a movable cam for actuating said adjustable optical means, means for varying the size of said framing means, a rotary control member journaled in the camera coaxial with the first-named cam, said control member being geared to the second cam and having a cam surface operatively connected to the means for varying the size of said framing means, means for detachably securing to said camera selectively coaxial with said first-named cam and with said control member any one of a number of interchangeable objective focusing mounts for photographic objectives of different focal lengths, each of which is adjustable for focusing, means on each of said focusing mounts, except one, for rotating said control member during attachment of the focusing mount to the camera, the last-named means rotating said control member different amounts for focusing mounts of different focal lengths, and means for coupling said first-named cam to each focusing mount, including said one, upon attachment of the focusing mount to the camera, whereby said first-named cam is rotated on focusing adjustment of each mount.

(References on following page)

References Cited in the file of this patent

UNITED STATES PATENTS

| | | | |
|---|---|---|---|
| 2,040,050 | Kuppenbender | May 5, | 1936 |
| 2,041,632 | Barnack | May 19, | 1936 |
| 2,113,407 | Leitz et al. | Apr. 5, | 1938 |
| 2,151,124 | Leitz | Mar. 21, | 1939 |
| 2,157,548 | Leitz | May 9, | 1939 |
| 2,172,339 | Mihalyi | Sept. 5, | 1939 |
| 2,187,246 | Nerwin | Jan. 16, | 1940 |
| 2,193,038 | Mihalyi | Mar. 12, | 1940 |
| 2,353,565 | Kaprelian | July 11, | 1944 |
| 2,437,032 | Kaprelian | Mar. 2, | 1948 |
| 2,552,940 | Cornut | May 15, | 1951 |
| 2,737,844 | Jerome et al. | Mar. 13, | 1956 |